United States Patent
Schwindl

(10) Patent No.: US 11,981,311 B2
(45) Date of Patent: May 14, 2024

(54) METHOD FOR OPERATING A MOTOR VEHICLE HAVING A BRAKING DEVICE

(71) Applicant: AUDI AG, Ingolstadt (DE)

(72) Inventor: Martin Schwindl, Neufahrn bei Freising (DE)

(73) Assignee: AUDI AG, Ingolstadt (DE)

( * ) Notice: Subject to any disclaimer, the term of this patent is extended or adjusted under 35 U.S.C. 154(b) by 938 days.

(21) Appl. No.: 16/967,870

(22) PCT Filed: Jan. 8, 2019

(86) PCT No.: PCT/EP2019/050333
§ 371 (c)(1),
(2) Date: Aug. 6, 2020

(87) PCT Pub. No.: WO2019/154574
PCT Pub. Date: Aug. 15, 2019

(65) Prior Publication Data
US 2021/0031739 A1 Feb. 4, 2021

(30) Foreign Application Priority Data
Feb. 6, 2018 (DE) ...................... 10 2018 201 835.9

(51) Int. Cl.
*B60T 8/17* (2006.01)
*B60T 7/04* (2006.01)
(Continued)

(52) U.S. Cl.
CPC ................ *B60T 8/17* (2013.01); *B60T 7/042* (2013.01); *B60T 7/12* (2013.01); *B60T 8/172* (2013.01);
(Continued)

(58) Field of Classification Search
CPC ... B60T 8/17; B60T 7/042; B60T 7/12; B60T 8/172; B60T 8/4081; B60T 13/745;
(Continued)

(56) References Cited

U.S. PATENT DOCUMENTS 8,909,452 B2 * 12/2014 Kato ................... B60W 10/188
701/96
2006/0195231 A1 * 8/2006 Diebold ................ B60R 21/013
701/1
(Continued)

FOREIGN PATENT DOCUMENTS

CN 102371960 A 3/2012
CN 104245447 A 12/2014
(Continued)

OTHER PUBLICATIONS

English-language translation of International Preliminary Report on Patentability issued on Aug. 11, 2020, in corresponding International Application No. PCT/EP2019/050333; 6 pages.
Office Action issued Nov. 2, 2022, in corresponding Chinese Application No. 201980022542.X, 12 pages.
(Continued)

*Primary Examiner* — Rami Khatib
(74) *Attorney, Agent, or Firm* — Maier & Maier, PLLC

(57) ABSTRACT

A method for operating a motor vehicle having a braking device for braking the motor vehicle, including the steps: forecasting an anticipated time period until a reduction in speed or braking of the motor vehicle, triggered by a driver assistance system or by the driver of the motor vehicle, depending on vehicle data relating to the motor vehicle and/or environmental data relating to the motor vehicle environment, and triggering a respective function of the braking device when a triggering condition assigned to the respective function is satisfied, wherein a respective triggering condition is satisfied or can be satisfied only when the anticipated time period falls below the limiting time value assigned to the respective function, wherein at least two of (Continued)

the functions are assigned limiting time values that differ from each other.

20 Claims, 1 Drawing Sheet

(51) Int. Cl.
  *B60T 7/12* (2006.01)
  *B60T 7/22* (2006.01)
  *B60T 8/172* (2006.01)
  *B60T 8/40* (2006.01)
  *B60T 13/74* (2006.01)

(52) U.S. Cl.
  CPC .......... *B60T 8/4081* (2013.01); *B60T 13/745* (2013.01); *B60T 7/22* (2013.01); *B60T 2201/022* (2013.01); *B60T 2201/024* (2013.01); *B60T 2201/03* (2013.01); *B60T 2210/30* (2013.01); *B60T 2220/04* (2013.01); *B60T 2250/04* (2013.01)

(58) Field of Classification Search
  CPC ................. B60T 7/22; B60T 2201/022; B60T 2201/024; B60T 2201/03; B60T 2210/30; B60T 2220/04; B60T 2250/04; B60T 2201/02; B60T 2201/12; B60T 2270/413
  See application file for complete search history.

(56) References Cited

U.S. PATENT DOCUMENTS

| | | | | |
|---|---|---|---|---|
| 2012/0022759 | A1* | 1/2012 | Inoue | B60T 7/22 701/70 |
| 2014/0067220 | A1* | 3/2014 | Seiler | B60T 7/12 701/1 |
| 2015/0158471 | A1* | 6/2015 | Ezoe | B60T 7/22 701/70 |
| 2015/0360665 | A1* | 12/2015 | Svensson | B60T 7/22 701/70 |

FOREIGN PATENT DOCUMENTS

| | | |
|---|---|---|
| CN | 105705390 A | 6/2016 |
| CN | 106103216 A | 11/2016 |
| DE | 19734567 A1 | 1/1999 |
| DE | 10160278 A1 | 12/2002 |
| DE | 102014206136 A1 | 11/2015 |
| WO | 2004/085220 A1 | 10/2004 |

OTHER PUBLICATIONS

Office Action issued on Mar. 3, 2022, in connection with corresponding Chinese Application No. 201980022542.X (12 pp., including machine-generated English translation).

International Search Report (with English translation) and Written Opinion (with Machine translation) issued on Apr. 2, 2019 in corresponding International Application No. PCT/EP2019/050333; 19 pages.

* cited by examiner

METHOD FOR OPERATING A MOTOR VEHICLE HAVING A BRAKING DEVICE

FIELD

The disclosure relates to a method for operating a motor vehicle having a braking device for braking the motor vehicle. In addition, the disclosure relates to a motor vehicle.

BACKGROUND

There are various driver assistance and emergency brake systems known which can detect the critical driving situations of a motor vehicle early on, for example the presence of an object or a person on a roadway, and advise the driver of said critical situation or implement braking interventions autonomously. In order to shorten braking distances, it is known in this case that a request signal is sent to the brake system before the braking intervention in order to request a so-called prefill of the brake system. With a prefill such as this, a slight pressure is established in the hydraulic system of the brake system with the aid of a pump in order for the brake pads to come into contact with the respective brake disc. This functionality enables a reduction in the delay time in the brake system for the pump startup and enables the air gap between the brake pads and the brake discs to be overcome.

The explained procedure is disadvantageous in that if the brake discs come into contact with the brake pads unnecessarily or too early, there will be unnecessary brake wear, and if the brake pads come into contact with the brake discs too late or not at all, there will not be optimum efficiency in the brakes, whereby a braking distance is lengthened. Because, in addition, the time it takes for the required pressure buildup can vary depending on the specific design of the brake system, it is necessary to configure the driver assistance and/or emergency brake systems as a function of the brake system installed in the individual vehicle. Even replacement of individual components of the brake system, for example of a pump for pressure buildup, as it is used, for example, for vehicle dynamics controls, of an electronic brake booster, or of an integrated braking module, which may comprise, for example, a master cylinder and additional components, may cause the driver assistance and/or emergency brake systems to no longer achieve their optimum performance level or result in unnecessary wear without reconfiguration of the driver assistance and/or emergency brake systems.

SUMMARY

Thus, the object upon which the invention is based is to provide a method which is improved by comparison for conditioning brake systems before a braking intervention in critical driving situations.

The object is achieved according to the invention by means of a method for operating a motor vehicle having a braking device for braking the motor vehicle, comprising the following steps:
   forecasting an anticipated time period until a reduction in speed or braking of the motor vehicle, triggered by a driver assistance system or by the driver of the motor vehicle, depending on vehicle data relating to the motor vehicle and/or environmental data relating to the motor vehicle environment, and
   triggering a respective function of the braking device when a triggering condition assigned to the respective function is satisfied, wherein a respective triggering condition is satisfied or can be satisfied only when the anticipated time period falls below the limiting time value assigned to the respective function, wherein at least two of the functions are assigned limiting time values that differ from each other.

It is thus proposed to trigger several functions of a braking device as a function of how long a predicted time period is until triggering of a reduction in speed or braking by a driver assistance system or by a driver. Such a procedure makes it possible to trigger functions, which can be used for preparing the speed reduction and/or the braking, automatically at the correct points in time and particularly cascaded in terms of time. The forecasting of the anticipated time period can be implemented repeatedly, particularly periodically, or continually. Upon an update of the anticipated time period, the individual functions can be checked again as to whether the respective triggering condition is satisfied, whereby the currently advantageous respective functions can be triggered upon a reduction in the expected time period until a reduction in speed and/or braking. For example, the voltage of an actuator, for example of a hydraulic pump, of the braking system can be increased a relatively long time before the forecasted reduction in speed and/or braking, and a prefill of the braking system can take place only relatively shortly before the braking and/or reduction in speed. If it is then determined, for example between the triggering of these functions, that an initially forecasted reduction in speed and/or braking actually will not occur as expected, the anticipated time period until the next reduction in speed and/or braking can hereby be increased. Thus, in the example mentioned, prefilling does not occur for example, whereby additional wear of the brake system is prevented.

As will be explained subsequently in detail, the method according to the invention can be especially advantageously used when the forecasting of the anticipated time period and the checking of the triggering condition take place by means of separate vehicle devices of the motor vehicle. For example, the forecasting of the anticipated time period can take place by means of a device which supports the driver assistance system, and the triggering conditions can be verified by means of a control unit of the braking device. This means that specific properties of the braking device, which impact what particular functions of the braking device are expediently implemented, do not have to be considered within the scope of forecasting the anticipated time period until the reduction in speed and/or braking. In addition, a relatively simple interface can be provided for triggering the functions of the braking device. It may be sufficient to provide the anticipated time period until the reduction in speed and/or braking to the device evaluating the triggering condition in order to enable a suitably cascaded triggering of the functions of the braking device.

The braking device functions used in the method according to the invention can particularly be used to prepare a reduction in speed and/or braking and particularly used for preconditioning the braking device for an expected braking process. The braking device may comprise several wheel brakes which transfer a braking torque to the respective wheel upon actuation. In this case, it is possible to actuate the wheel brakes together or they can be actuated separately. The actuation may particularly be hydraulic.

The forecasting of an anticipated time period until a reduction in speed and/or braking triggered by a driver may particularly take place as a function of vehicle data relating to the operating actions of a driver. For example, operating actions on an accelerator pedal and/or a brake pedal and/or a clutch and/or a steering element can be detected and evaluated via corresponding sensors. For example, a quick throttle reduction may indicate that the driver is expected to brake strongly. Driver assistance systems, for example driver assistance systems which are used for preventing collisions or for distance-dependent speed control, can forecast an anticipated future driving situation, particularly as a function of environmental data detected particularly with sensors, and forecast, as a function thereof, an anticipated time period until a reduction in speed or braking to be implemented advantageously. A forecasting of future braking interventions by means of driver assistance systems is known from the prior art and thus this will not be explained in detail. A function for forecasting the anticipated time period until braking and/or a reduction in speed can be implemented manually. Alternatively, it would be possible, for example, to use a method of machine learning in order to train a corresponding forecasting function.

The speed of the motor vehicle may be independent of a triggering of at least one of the functions of the braking device, preferably a triggering of all functions of the braking device, which are assigned to a respective triggering condition dependent on the anticipated time period. The speed may be completely independent of the triggering of the function or functions; however, it is also possible that it is substantially independent thereof. For example, contact between the brake pads and the brake discs does have a minimal impact on speed. However, this is barely perceptible in normal driving situations. The function or the functions of the braking device can be designed such that the motor vehicle is braked at less than 0.1 m/s² by means of the triggering of said function or functions.

Upon the triggering of at least one of the functions of the braking device, an actuator relevant for the braking of the motor vehicle can be actuated and/or an operating voltage of said actuator can be increased and/or a dependency of a braking process on the position and/or the position change of a brake pedal can be modified. The increase in an operating voltage of an actuator, for example of a hydraulic pump, of the braking device, can increase the performance of the actuator and thus enable, for example, quicker pressure buildup in the brake circuit. An increase in operating voltage can take place, for example, by means of a voltage control in the vehicle's entire electrical system or in a section of the vehicle's electrical system which comprises the actuator, for example with the aid of a DC/DC converter. However, it is also possible to introduce other measures which can increase a voltage of the vehicle's electrical system and/or a voltage at an actuator, for example the starting of a combustion engine which drives a generator, for example an alternator, or which prevents idling of such a generator.

The actuation of an actuator can directly impact a brake circuit, for example, increase a pressure in the brake circuit due to operation of a hydraulic pump, or the actuation can occur such that a delay is prevented. For example, the motor of a hydraulic pump can be started, wherein the hydraulic pump, however, is initially operated in idle mode.

Particularly in cases in which the braking and/or reduction in speed is implemented by the driver, it may be advantageous to modify a dependency of a braking process on the position and/or position change of a brake pedal, as a function for preconditioning the braking device. For example, a brake pedal characteristic curve can be adapted, particularly in that an adjustable, particularly electronic, brake booster is correspondingly configured. For example, the counteracting forces which are active upon actuation of a brake pedal can hereby be adjusted. A position change of a brake pedal is considered, for example, in systems for hydraulic braking support. Such systems are used to implement stronger braking when it is determined that a driver intends to implement strong braking but the adjustment of the brake pedal is too slow for this or it is implemented with insufficient maximum force. The intention of strong braking can be detected, for example, when certain limit values are exceeded for a position and/or a speed of the position change of the brake pedal. In this case, the braking force and/or a brake pressure of the braking device can automatically and quickly be increased to a predefined value. Limit values, for example for the required position of the brake pedal and/or for the required speed of the position change, can be adapted as one of the functions of the braking device for preconditioning of the braking device, starting at which such assisted braking takes place.

At least one of the functions can increase, upon the triggering thereof, a pressure in a brake circuit of the motor vehicle to a predefined value and/or with a predefined pressure gradient over time. An increase in the pressure in a brake circuit of the motor vehicle to a predefined value can particularly facilitate contact between the brake pads and the brake discs without having to press them in order to brake the motor vehicle. During braking, the delay time of the braking device, which would otherwise be necessary for starting a hydraulic pump and for overcoming the air gap between the brake pad and the brake disc, can hereby be reduced.

Particularly in cases in which an anticipated future reduction in speed and/or braking is not detected until relatively late, i.e. the anticipated time period until said reduction in speed or braking is very short, for example shorter than 0.1 s, it may be advantageous to specify the pressure gradient over time, i.e. how quickly a pressure buildup should take place, instead of a target value for the pressure in the brake circuit. The gradient can particularly be specified such that the pressure until the point in time of the anticipated reduction in speed and/or braking increases continually and strictly monotonically, wherein there is no delay before the point in time of the predicted reduction in speed and/or braking, and a monotonically increasing delay takes place, starting at the point in time of the anticipated reduction in speed and/or braking or as quickly as possible after this point in time.

At least one of the triggering conditions is satisfied or can be satisfied only when a further limiting time value assigned to the function is exceeded by the anticipated time period. Some of the functions and/or conditioning measures for preparing a braking action or reduction in speed are suitable only when they are implemented sufficiently early enough before a predicted braking action and/or reduction in speed. For example, if a combustion engine is to be started in order to increase the voltage in a vehicle's electrical system and thus to achieve increased performance of at least one actuator of the braking device, the start of the engine may initially lead to a brief reduction in the vehicle's electrical system voltage before it is increased due to operation of the engine. Thus, a starting of the engine right before a predicted braking action or reduction in speed could be disadvantageous for the performance of the braking device under some circumstances.

Due to the or a further driver assistance system or due to query of a user input, haptic information can be determined which indicates whether functions of the braking device should be used which can impact haptics of a brake pedal actuation, wherein the satisfying of at least one of the triggering conditions depends on the haptic information. The haptics of a brake pedal actuation can be impacted, for example, when a brake pedal characteristic curve is adapted or a hydraulic braking assistant is configured differently, because, in this case, the braking force can be increased so much that a traction control element, which impacts the haptics at the brake pedal, can be triggered earlier. If a pressure in a brake circuit of the motor vehicle is increased due to the function, this can also lead to a change in the haptics of the brake pedal actuation when a directly coupled braking system is used. Depending on the specific driving situation or the user preferences, it may be desirable to prevent such impacting of the haptics, whereby corresponding functions can be blocked or used only under certain supplementary conditions. However, it may also be possible that such impacting of the haptics is desired, which is why corresponding functions which do not impact the haptics of the brake pedal actuation are used in these cases, for example sooner or under less strict boundary constraints.

In the method according to the invention, a respective anticipated time period until the reduction in speed or braking is predicted by several prediction modules, wherein, during the evaluation of the triggering condition, exclusively the shortest anticipated time period predicted for a current driving situation is considered. For example, one of the prediction modules can evaluate driver actions and predict future reductions in speed and/or braking actions as a function thereof. Other prediction modules may be assigned, for example, to individual driver assistance systems. For example, one of the anticipated time periods can be predicted by a driver assistance system for distance control, and one of the anticipated time periods can be predicted by a driver assistance system for collision prevention. Due to the described procedure, the preconditioning of the braking device occurs continually for the next anticipated braking action and/or reduction in speed.

The forecasting of the anticipated time period until the reduction in speed and/or braking can take place by means of a first vehicle device of the motor vehicle, which implements particularly a driver assistance system, and the evaluation of the triggering conditions can take place by means of a second vehicle device, which is formed separately from the first vehicle device, of the motor vehicle, which is particularly a control unit of the braking device, wherein the anticipated time period until the reduction in speed or the braking is provided via a communication interface between the first and the second vehicle devices. The first vehicle device in this case can implement the driver assistance system triggering the anticipated future braking or reduction in speed and/or at least one further driver assistance system.

Due to the described procedure, a simple communication interface, which can communicate, for example, via a vehicle bus, is obtained, by means of said interface the respective advantageous functions of the braking device can be triggered as needed and in a cascaded manner. Thus, the communication interface may be provided independently of the functions actually implemented by the braking device for preconditioning the braking device. For example, further functions can thus be supplemented or only parts of the functions can be implemented without the communication interface or the driver assistance systems having to be modified.

Thus, it is possible that the driver assistance systems and the functions for preconditioning the braking device can be implemented and/or refined substantially independently of one another. The method according to the invention for deceleration conditioning is thus easy to expand and/or to modify as relates to the driver assistance systems and/or prediction modules used and as relates to the functions provided for preconditioning the braking device.

In addition to the method according to the invention, the invention relates to a motor vehicle comprising one vehicle device or two separate vehicle devices communicating via a communication interface, said vehicle devices being configured jointly to implement the method according to the invention. The motor vehicle according to the invention can be refined with the features explained as relates to the method according to the invention and vice versa.

If two or more separate vehicle devices are used in order to implement the method according to the invention, the first of these vehicle devices, which can implement particularly at least one driver assistance system, can thus be used for forecasting the anticipated time period until the reduction in speed or braking, while the second vehicle device, which is particularly a control unit of the braking device, can be used to evaluate the triggering conditions and for triggering the functions for which the triggering conditions are satisfied. The communication interface can be implemented particularly in the form of a defined hardware interface. For example, communication can take place via a vehicle bus. In particular, a time value describing the anticipated time period can be transmitted between the first and the second vehicle device, whereby, as previously explained, the two vehicle devices can be refined and/or configured substantially independently of one another. The time value can be transmitted, for example, with a fixed cycle or when an update condition is respectively satisfied.

BRIEF DESCRIPTION OF THE DRAWINGS

Further advantages and individual details of the invention result from the following exemplary embodiments as well as the corresponding drawings. The following is shown schematically.

DETAILED DESCRIPTION

Figure 1:
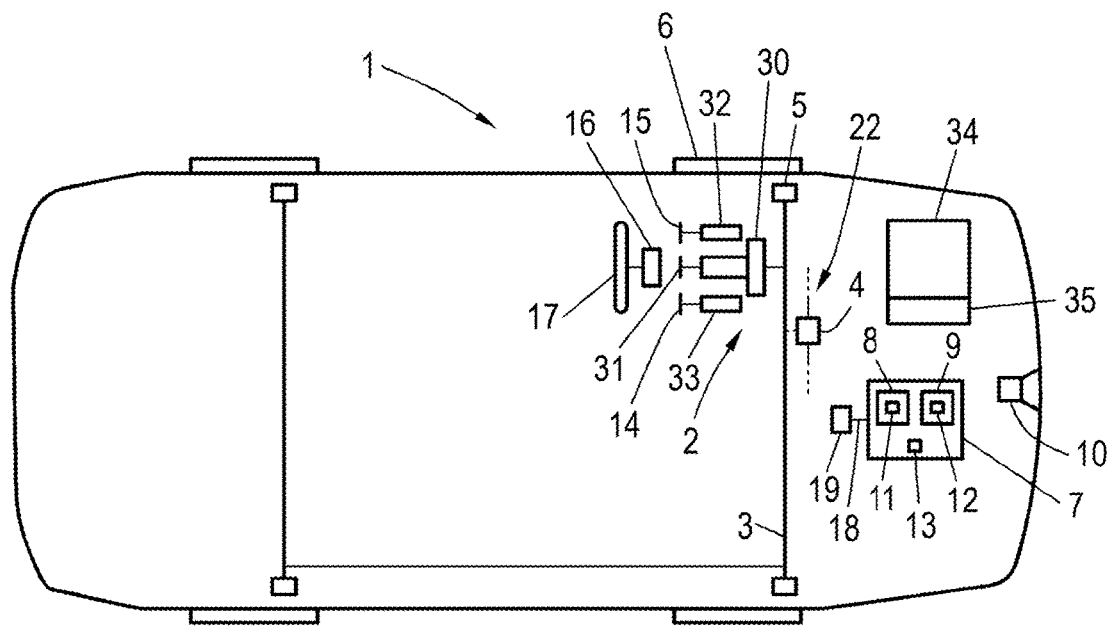
FIG. 1 an exemplary embodiment of a motor vehicle according to the invention, by means of which an exemplary embodiment of the method according to the invention can be implemented.

FIG. 1 shows a motor vehicle 1, with which a method for preconditioning a braking device 2 can be implemented in order to precondition said braking device well before a predicted braking and/or reduction in speed, particularly in critical driving situations. For the sake of clarity, the braking device is shown in simplified form in FIG. 1. The wheel brakes for various wheels 6 each comprise a brake pad 5, which can be pressed onto brake discs, which are not shown, in order to brake the wheels 6. The pressing of the brake pad 5 onto the brake discs takes place hydraulically or via a hydraulic brake circuit 3. For the sake of clarity, one common brake circuit 3 is shown for all four wheels 6 in FIG. 1. Additional means are frequently used in actual vehicles in order to enable braking of individual wheels 6 at different strengths or to enable specifying of at least one brake force distribution between the front and rear axles.

The pressure in the brake circuit 3 can be increased in that a brake pedal 31 is depressed by a driver. The brake pedal 31 is coupled to the brake circuit 3 via an electric and thus adjustable brake booster 30 such that the relationship between a force exerted onto the brake pedal 31 and the pressure change in the brake circuit 3 and thus the brake pedal characteristic curve is adjustable. In addition, the pressure in the brake circuit 3 can be increased in that an actuator 4, namely a hydraulic pump, is activated. For the sake of clarity, only one such actuator is represented in the motor vehicle 1 shown. However, several of these actuators are frequently used in actual vehicles, particularly one actuator per wheel, in order to increase the braking forces at individual wheels 6 in a targeted manner, for example within the scope of a stability control element.

In certain, particularly critical, driving situations, it may be advantageous to precondition the braking device 2 when a reduction in speed or braking action is to take place in the future. For example, if an automatic braking action is to be implemented by a driver assistance system, the actuator 4, that is, e.g., a hydraulic pump, must start up first, whereby the implementation of the braking process can be delayed. In addition, the brake pads 5 are typically spaced apart from the brake discs by an air gap to the extent that this air gap must first be overcome during a braking action. As a whole, a braking process may be completed later than desired and/or the desired deceleration strength cannot be immediately achieved in some circumstances. Depending on the situation, this should be counteracted by a corresponding conditioning of the braking device 2.

In order to enable such preconditioning, initially a forecasting of an anticipated time period until a reduction in speed or braking, triggered by a driver assistance system 8, 9 or a driver, is predicted in the motor vehicle 1. This takes place by means of a first vehicle device 7 in the motor vehicle 1. This device implements two driver assistance systems 8, 9 in the example. Driver assistance system 8 is an adaptive cruise control, which is used to maintain a constant distance apart from a vehicle ahead detected via a sensor 10 Driver assistance system 9 is a collision prevention system or a system to minimize the effects of a collision, which detects obstacles in the environment of the motor vehicle 1 via the sensor 10 and prevents a collision with said obstacles or minimizes the effects thereof due to braking and/or steering interventions. Both of the driver assistance systems 8, 9 can detect that a reduction in speed and/or braking of the motor vehicle 1 will foreseeably be necessary in the future. A time period until a reduction in speed and/or braking foreseeably triggered by the respective driver assistance system 8, 9 is predicted by a respective prediction module 11, 12.

For preconditioning of the braking system, it may also be relevant to detect operating actions of a driver which enable the expectation of an anticipated future reduction in speed and/or braking. Thus, the first vehicle device 7 additionally implements a further prediction module 13, which predicts an anticipated time period until a reduction in speed or braking by the driver of the motor vehicle. This prediction can be determined as a function of steering angles and/or steering moments on a steering wheel 17 which are detected via a sensor 16 and/or as a function of actuations of the accelerator pedal 14 and/or the clutch 15 which are detected via the sensors 32, 33. For example, a quick throttle reduction at the accelerator pedal 14 can be considered an indicator of prompt braking by the driver. As a supplement or alternative, environmental data, which can be detected, for example, via the sensor 10, can be evaluated in order to predict driver actions.

A time value which describes the shortest time periods predicted by the prediction modules 11, 12, 13 is transmitted, via the communication interface 18, which can be implemented, for example, by means of a vehicle bus, to a second vehicle device 19, which is particularly a control unit of the braking device 2. As a function of this transmitted time period, various functions of the braking device 2, which are used to precondition the braking devices 2 before a braking action and/or reduction in speed, can be activated by the second vehicle device 19.

Figure 2:
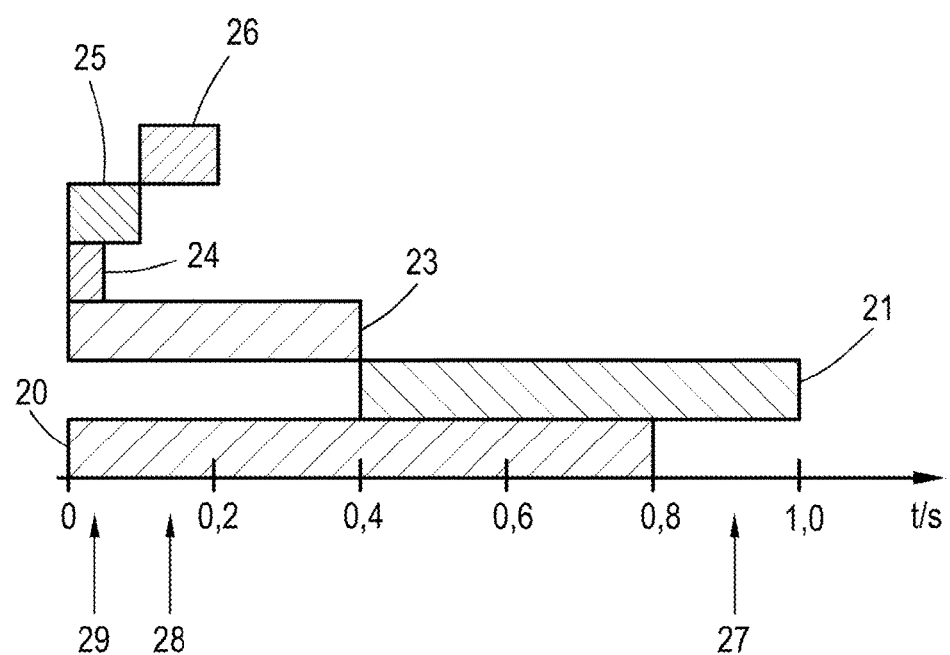
FIG. 2 an example indicating which functions can be implemented in a braking device at which point in time before a predicted braking and/or reduction in speed.

An example of various usable functions of the braking device 2 and time limits for the triggering thereof are explained in the following with reference to FIG. 2. FIG. 2 shows a timeline which indicates the time period until a predicted reduction in speed and/or braking. In this case, various functions 20, 21, 23-26 can be triggered at various times before the reduction in speed and/or braking. In order to achieve this, a triggering condition is assigned to each of the functions 20, 21, 23-26, it being necessary for the fulfilment thereof that the anticipated time period until the reduction in speed and/or braking, which has been transmitted via the communication interface 18, be within the time interval shown in FIG. 2 for the corresponding function 20, 21, 23-26. The triggering conditions assigned to the functions 20, 21, 23-26 are thus satisfied or can be satisfied only when the anticipated time period falls below a limiting time value assigned to the respective function 20, 21, 23-26. The triggering conditions for functions 21 and 26 are satisfied or can be satisfied additionally only when a lower limiting time value of 0.4 or 0.1 seconds, respectively, in the example is exceeded by the anticipated time period until the reduction in speed or braking. As will be explained in greater detail subsequently, the triggering conditions of the functions 20, 21, 23-26 may additionally depend on further factors.

The anticipated time period until the reduction in speed and/or braking is determined periodically in the motor vehicle 1. Thus, if a future reduction in speed or braking is detected early on, for example at point in time 27, the functions 20, 21, 23-26 are activated in the defined chronological sequence in order to precondition the braking device for the pending reduction in speed and/or braking. If it is detected, between this first detection and the predicted point in time, that a braking action and/or reduction in speed is not occurring or not occurring until later, a longer anticipated time period until the reduction in speed and/or braking is thus also predicted, whereby the execution of the cascade of functions 20, 21, 23-26 is interrupted or delayed.

If a forecasting of a reduction in speed or braking required very quickly is anticipated in the future, for example because of suddenly appearing obstacles or unforeseeable driver actions, it is no longer necessary to activate all of functions 20, 21, 23-26. For example, with a detection only approximately 0.15 seconds before the predicted reduction in speed and/or braking, i.e. at point in time 28, initially only functions 20, 23, and 26 would be activated, and functions 25 and 24 are activated at later times in a cascading manner. With a very quick detection, i.e. with a very short anticipated time period until the reduction in speed or braking, for example at point in time 29, functions 20, 23, 24, and 25 are activated immediately and then no additional functions subsequently.

By specifying upper and optionally lower limiting time values for the individual functions 20, 21, 23-26 within the scope of the triggering condition, it can thus be achieved that the preconditioning functions 20, 21, 23-26 can be activated in an expedient order and chronological sequence upon early detection of a future probable reduction in speed or braking and that a suitable sub-group of the functions to be activated is selected as well in cases in which anticipated reductions in speed or braking interventions are not detected until later.

All functions which can support a future reduction in speed and/or a future braking intervention in a preparatory manner can be used as the functions 20, 21, 23-26. Function 20 can adapt a triggering threshold for a hydraulic braking assistant. A hydraulic brake assistant can increase the pressure in the brake circuit 3 quickly, particularly up to the point of engaging a traction control when it is detected, in an anticipatory manner, by means of the actuation pattern of the brake pedal 31 that emergency braking is desired by the driver. In this case, typically limit values for an actuation force and a gradient of the actuation force of the brake pedal 31 are specified, which can be reduced upon activation of function 20, in order to enable easier triggering of emergency braking.

Function 21 implements a voltage increase in a section of the vehicle's electrical system 22, which applies current to the actuator 4. The performance of the actuator 4 can hereby be increased, whereby quicker pressure buildup can be achieved in the brake circuit 3. In principle, it would also be possible to increase the operating voltage, for example, by means of a corresponding control of DC/DC converters. In the motor vehicle 1, the increase in the operating voltage should be achieved, however, in that a drive motor 34 of the motor vehicle 1 is started in order to increase the vehicle's voltage via the generator 35. Because starting the motor can initially reduce the vehicle's voltage, function 21 is then only activated when there is at least 0.4 seconds remaining until the anticipated point in time of the braking and/or speed reduction.

Function 23 actuates the actuator 4 in order to enable startup of a drive motor of the hydraulic pump. In this case, the motor is initially operated in idle mode, i.e. initially there is no pressure change in the brake circuit 3. However, applying current to the actuator 4 early on may prevent a delay which would develop due to a startup of a motor of the pump.

A characteristic curve for the brake pedal 31 is adapted by function 24. This is achieved in that the electronic brake booster 30 is adjusted such that the transmit function of a force applied to the brake pedal is changed to a pressure change in the brake circuit 3. For example, the characteristic curve is modified such that a maximum pressure is set in the brake circuit 3, at a lower force level, in order to trigger emergency braking. It is possible to implement a corresponding reconfiguration of the brake booster 30 very quickly. In order to prevent undesired braking behavior in normal operation, the adaptation, provided by function 24, of the dependency of the braking process on the position of the brake pedal 31 is implemented only briefly before the predicted point in time for the braking and/or reduction in speed. In other words, a small limit value, for example 0.05 seconds, is specified, and function 24 is then only triggered when the time period falls below the limiting time value.

Functions 25 and 26 both lead to an increase in the pressure in the brake circuit 3 due to operation of the actuator 4. Function 26, which was activated earlier in time, triggers an increase in the pressure to a defined value, at which particularly the brake pads 5 already have contact with the brake discs. Because the brake pads 5 have contact with a low pressure however, this does not result in any substantial impact on the speed of the motor vehicle 1. Because this contact between the brake pads 5 and the brake discs can lead to additional wear, function 26 is only triggered relatively shortly, for example 0.2 seconds, before the predicted point in time of the braking and/or reduction in speed.

Function 25 likewise increases the pressure in the brake circuit 3 in the event of insufficient pressure, wherein a gradient-based control occurs in this case. The gradient of the pressure in this case is selected such that the pressure in the brake circuit 3 increases strictly monotonically, wherein there is essentially not yet any delay at the point in time of the predicted braking and/or reduction in speed; however, it increases strictly monotonically starting at the point in time of the anticipated reduction in speed and/or braking. Such a gradient-based pressure increase may be advantageous when a pressure increase is to occur very shortly before the point in time of the braking and/or reduction in speed.

As previously explained, the activation of the functions 20, 21, 23-26 may depend on additional factors. Depending on the driving situation or the specification of a driver, it may be desired that functions which modify the haptics of an actuation of the brake pedal 31 are preferably used or preferably not used. The haptics on the brake pedal 31 are impacted by function 20, particularly by the adjustment of the hydraulic brake assistant, and the pedal characteristic curve is impacted by function 24. In directly coupled braking systems, the haptics furthermore depend on the pressure in the brake circuit 3, whereby the haptics are also impacted by functions 25 and 26. If an impact on the haptics is not desired, these functions can be omitted or they can be used, for example, only upon the satisfying of an additional condition, for example upon the detection of an especially critical driving situation.

The invention claimed is:

1. A method for operating a motor vehicle having a braking device for braking the motor vehicle, the braking device comprising a storage medium storing at least two functions, a first function in the at least two functions associated with a first triggering condition and a first limiting time value, and a second function in the at least two functions associated with a second triggering condition and a second limiting time value, wherein the first limiting time value is larger than the second limiting time value, wherein the method comprises steps of:

forecasting an anticipated time period until a reduction in speed or braking of the motor vehicle, triggered by a driver assistance system or by the driver of the motor vehicle, depending on at least one of: vehicle data relating to the motor vehicle and environmental data relating to the motor vehicle environment, determining whether the anticipated time period is below the first limiting time value assigned to the first function, and, upon the anticipated time period falling below the first limiting time value, determining whether the first triggering condition is satisfied;

upon satisfaction of the first triggering condition, triggering a first function of the braking device;

determining whether the anticipated time period is below the second limiting time value assigned to the second function, and, upon the anticipated time period falling below the second limiting time value, determining whether the second triggering condition is satisfied; and upon satisfaction of the second triggering condition, triggering a second function of the braking device, comprising one or both of: performing the second function at a same time as the first function and performing the second function after the first function;

wherein the first function of the braking device controls a first actuator and the second function of the braking device controls a second actuator different from the first actuator.

2. The method according to claim 1, wherein triggering the first function of the braking device comprises maintaining a current speed of the motor vehicle.

3. The method according to claim 2, further comprising providing a third trigger condition associated with a further limiting time value, wherein the further limiting time value is larger than the first limiting time value, and, upon the anticipated time period exceeding the further limiting time value, determining whether the third trigger condition has been satisfied.

4. The method according to claim 2, further comprising:
based on an instruction from at least one of: the driver assistance system, a further driver assistance system, or the driver of the motor vehicle, determining haptic information, said haptic information indicating whether functions of the braking device should be used which can impact haptics of a brake pedal actuation, wherein the satisfying of at least one of the first triggering condition and the second triggering condition depends on the haptic information.

5. The method according to claim 2, wherein a plurality of anticipated time periods until the reduction in speed or braking are predicted by several prediction modules wherein, during the evaluation of the triggering condition, exclusively a shortest anticipated time period predicted for a current driving situation is considered.

6. The method according to claim 1, wherein at least one of triggering the first function of the braking device and triggering the second function of the braking device comprises: actuating an actuator relevant for the braking of the motor vehicle, increasing an operating voltage of said actuator, modifying a dependency of a braking process on the position of a brake pedal, and modifying the position change of a brake pedal.

7. The method according to claim 6, wherein at least one of the first function of the braking device and second function of the braking device comprises: increasing a pressure in a brake circuit of the motor vehicle to a predefined value, or increasing a predefined pressure gradient over time.

8. The method according to claim 6, further comprising providing a third trigger condition associated with a further limiting time value, wherein the further limiting time value is larger than the first limiting time value, and, upon the anticipated time period exceeding the further limiting time value, determining whether the third trigger condition has been satisfied.

9. The method according to claim 6, further comprising:
based on an instruction from at least one of: the driver assistance system, a further driver assistance system, or the driver of the motor vehicle, determining haptic information, said haptic information indicating whether functions of the braking device should be used which can impact haptics of a brake pedal actuation, wherein the satisfying of at least one of the first triggering condition and the second triggering condition depends on the haptic information.

10. The method according to claim 1, wherein at least one of the first function of the braking device and second function of the braking device comprises: increasing a pressure in a brake circuit of the motor vehicle to a predefined value, or increasing a predefined pressure gradient over time.

11. The method according to claim 10, further comprising providing a third trigger condition associated with a further limiting time value, wherein the further limiting time value is larger than the first limiting time value, and, upon the anticipated time period exceeding the further limiting time value, determining whether the third trigger condition has been satisfied.

12. The method according to claim 10, further comprising:
based on an instruction from at least one of: the driver assistance system, a further driver assistance system, or the driver of the motor vehicle, determining haptic information, said haptic information indicating whether functions of the braking device should be used which can impact haptics of a brake pedal actuation, wherein the satisfying of at least one of the first triggering condition and the second triggering condition depends on the haptic information.

13. The method according to claim 1, further comprising providing a third trigger condition associated with a further limiting time value, wherein the further limiting time value is larger than the first limiting time value, and, upon the anticipated time period exceeding the further limiting time value, determining whether the third trigger condition has been satisfied.

14. The method according to claim 13, further comprising:
based on an instruction from at least one of: the driver assistance system, a further driver assistance system, or the driver of the motor vehicle, determining haptic information, said haptic information indicating whether functions of the braking device should be used which can impact haptics of a brake pedal actuation, wherein the satisfying of at least one of the first triggering condition and the second triggering condition depends on the haptic information.

15. The method according to claim 1, further comprising:
based on an instruction from at least one of: the driver assistance system, a further driver assistance system, or the driver of the motor vehicle, determining haptic information, said haptic information indicating whether functions of the braking device should be used which can impact haptics of a brake pedal actuation, wherein the satisfying of at least one of the first triggering condition and the second triggering condition depends on the haptic information.

16. The method according to claim 1, wherein a plurality of anticipated time periods until the reduction in speed or braking are predicted by several prediction modules wherein, during the evaluation of the triggering condition, exclusively a shortest anticipated time period predicted for a current driving situation is considered.

17. The method according to claim 1, wherein the forecasting of the anticipated time period until the reduction in speed and/or braking is performed by a first vehicle device of the motor vehicle configured to implement a driver assistance system, and the evaluation of the triggering conditions is performed by a second vehicle device, which is formed separately from the first vehicle device, of the motor vehicle, comprising a control unit of the braking device, wherein the anticipated time period until the reduction in speed or the braking is provided via a communication interface between the first and the second vehicle device.

18. A motor vehicle, comprising:
a braking device for braking the motor vehicle, comprising a storage medium storing at least two functions, a first function in the at least two functions associated with a first triggering condition and a first limiting time value, and a second function in the at least two functions associated with a second triggering condition and a second limiting time value, wherein the first limiting time value is larger than the second limiting time value, wherein the braking device is configured to execute a set of steps comprising:

forecasting an anticipated time period until a reduction in speed or braking of the motor vehicle, triggered by a driver assistance system or by the driver of the motor vehicle, depending on at least one of: vehicle data relating to the motor vehicle and environmental data relating to the motor vehicle environment, determining whether the anticipated time period is below the first limiting time value assigned to the first function, and, upon the anticipated time period falling below the first limiting time value, determining whether the first triggering condition is satisfied;

upon satisfaction of the first triggering condition, triggering a first function of the braking device;

determining whether the anticipated time period is below the second limiting time value assigned to the second function, and, upon the anticipated time period falling below the second limiting time value, determining whether the second triggering condition is satisfied; and upon satisfaction of the second triggering condition, triggering a second function of the braking device, comprising one or both of: performing the second function at a same time as the first function and performing the second function after the first function;

wherein the first function of the braking device controls a first actuator and the second function of the braking device controls a second actuator different from the first actuator, wherein the braking device comprises one vehicle device or two separate vehicle devices communicating via a communication interface, said vehicle device or devices being configured jointly to implement the set of steps.

19. The method according to claim 2, wherein at least one of triggering the first function of the braking device and triggering the second function of the braking device comprises: actuating an actuator relevant for the braking of the motor vehicle, increasing an operating voltage of said actuator, modifying a dependency of a braking process on the position of a brake pedal, and modifying the position change of a brake pedal.

20. The method according to claim 2, wherein at least one of the first function of the braking device and second function of the braking device comprises: increasing a pressure in a brake circuit of the motor vehicle to a predefined value, or increasing a predefined pressure gradient over time.

* * * * *